US012763534B2

(12) United States Patent
Mastenbrook

(10) Patent No.: US 12,763,534 B2
(45) Date of Patent: Oct. 13, 2026

(54) SELF-PASSIVATING MATERIAL COMMUNICATION CABLE SYSTEM

(71) Applicant: NORTHROP GRUMMAN SYSTEMS CORPORATION, Falls Church, VA (US)

(72) Inventor: Gary E. Mastenbrook, Ann Arbor, MI (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 351 days.

(21) Appl. No.: 18/523,466

(22) Filed: Nov. 29, 2023

(65) Prior Publication Data

US 2025/0174945 A1 May 29, 2025

(51) Int. Cl.
*H01R 24/56* (2011.01)
*H01R 9/05* (2006.01)
*H01R 24/44* (2011.01)

(52) U.S. Cl.
CPC ........... *H01R 24/56* (2013.01); *H01R 9/0521* (2013.01); *H01R 24/44* (2013.01)

(58) Field of Classification Search
CPC ...... H01R 24/56; H01R 9/0521; H01R 24/44; H01R 13/523; H01R 24/40; H01B 1/02
See application file for complete search history.

(56) References Cited

U.S. PATENT DOCUMENTS 3,022,242 A * 2/1962 Anderson ............... C23F 13/06 D13/199
3,613,050 A * 10/1971 Andrews .............. H01R 24/562 174/75 C
4,346,253 A * 8/1982 Saito .................. H01B 11/1808 174/29
4,621,169 A * 11/1986 Petinelli ............. H01B 11/1058 174/23 C
4,910,998 A 3/1990 Willis et al.
5,746,616 A * 5/1998 Mar ..................... A61N 1/0563 174/DIG. 12
2008/0047727 A1* 2/2008 Sexton ................... H01B 9/006 174/36

(Continued)

FOREIGN PATENT DOCUMENTS

CN 101051539 * 10/2007 ............. H01B 11/18
CN 101278446 B 12/2010
CN 113724936 B 9/2023

OTHER PUBLICATIONS

WOISR (Notification of Transmittal of the International Search Report and the Written Opinion of the International Searching Authority, or the Declaration), for PCT/US2024/053425, mailed Feb. 12, 2025.

*Primary Examiner* — Truc T Nguyen

(57) ABSTRACT

In a described example, a cable can include a first conductor, a second conductor, and an offset structure. The first conductor can be formed to include a first self-passivating metal. The second conductor can be formed to include a second self-passivating metal. The offset structure can be disposed between the first conductor and the second conductor. The offset structure can be configured to enable a medium to contact the first conductor and the second conductor along a length of the cable. Further, a cable connection system can include the cable, a first connector, and a second connector.

20 Claims, 4 Drawing Sheets

(56) References Cited

U.S. PATENT DOCUMENTS

| | | | | |
|---|---|---|---|---|
| 2009/0229851 | A1* | 9/2009 | Thuot | H01B 13/142 174/107 |
| 2010/0212926 | A1* | 8/2010 | Cho | H01B 11/1878 174/28 |
| 2011/0065312 | A1* | 3/2011 | Bies | H01R 13/465 439/491 |
| 2012/0009815 | A1* | 1/2012 | Walsh | A61N 1/056 439/449 |
| 2012/0013433 | A1* | 1/2012 | Rauh | H01C 13/00 174/128.1 |
| 2012/0024569 | A1 | 2/2012 | Jiang et al. | |
| 2012/0289079 | A1* | 11/2012 | Amidon | H01R 13/6584 439/489 |
| 2014/0041897 | A1* | 2/2014 | Kim | H01B 7/04 174/120 C |
| 2015/0368496 | A1* | 12/2015 | Hawig | H01B 3/445 174/110 SR |
| 2023/0125387 | A1* | 4/2023 | Johnson | H01R 13/6456 439/39 |

* cited by examiner

SELF-PASSIVATING MATERIAL COMMUNICATION CABLE SYSTEM

TECHNICAL FIELD

The present disclosure relates generally to electrical systems, and specifically, to a communication cable and a connector for the cable.

BACKGROUND

Signal connectors that provide electrical connection between a pair of wires are necessary in nearly every piece of wired communications environment. There are numerous environmental challenges that can arise from ensuring connection of wires over long distances, such as to facilitate the use of signal connectors. One such environmental challenge includes the use of signal connectors in environments that can provide electrical conduction in ambient conditions. For example, electrical connections can be required in environments such as in fluids, such as water (e.g., seawater), that can create challenges in ensuring that separate signal conductors do not experience conduction between each other. Such conduction can lead to signal loss, noise, and/or cross-talk in the respective signals that are transmitted.

SUMMARY

In a described example, a cable can include a first conductor, a second conductor, and an offset structure. The first conductor can be formed to include a first self-passivating metal. The second conductor can be formed to include a second self-passivating metal. The offset structure can be disposed between the first conductor and the second conductor. The offset structure can be configured to enable a medium to contact the first conductor and the second conductor along a length of the cable.

In a described example, a method of forming a cable can include forming a first conductor to include a first self-passivating metal, forming a second conductor to include a second self-passivating metal, and forming an offset structure to be disposed between the first conductor and the second conductor and formed to maintain a constant distance between the first conductor and the second conductor.

In a described example, a cable connection system can include a cable, a first connector, and a second connector. The cable can include a first conductor formed to include a first self-passivating metal, a second conductor formed to include a second self-passivating metal, and an offset structure disposed between the first conductor and the second conductor. The offset structure can be configured to enable a medium to contact the first conductor and the second conductor along a length of the cable. The first connector can include a first housing, a first contact formed from a third self-passivating metal and having a first portion configured to be in contact with the medium, and a first contact insulator at least partially surrounding a second portion of the first contact. The first contact of the first connector can be electrically connected to the first conductor of the cable. The second connector can include a second housing, a second contact formed from a fourth self-passivating metal and having a first portion configured to be in contact with the medium, and a second contact insulator at least partially surrounding a second portion of the second contact, the first housing and the second housing can be configured to be coupled to provide an electrical connection between the first contact of the first connector and the second contact of the second connector.

DETAILED DESCRIPTION

Figure 1A:
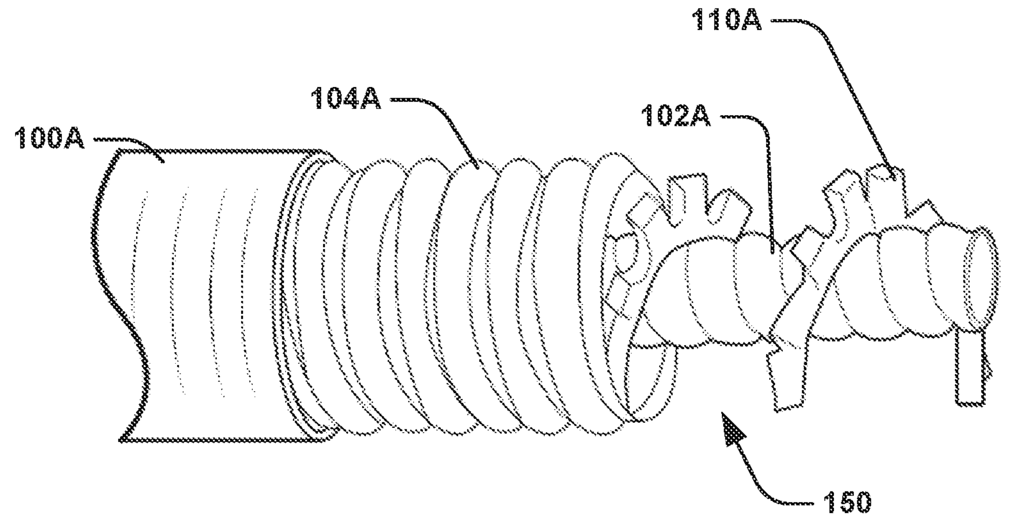
FIGS. 1A-1B illustrate an example diagram of a cable with an offset structure.

This description relates to electrical systems, and specifically, to a cable and a communication cable connection system for the cable. A cable, such as a coaxial cable, can include a first conductor formed of a first self-passivating metal, such as niobium, a second conductor formed of a second self-passivating metal, and an offset structure disposed between the first conductor and the second conductor. According to one example, the first self-passivating metal and the second self-passivating metal can be the same self-passivating metal. Examples of self-passivating metals include niobium, tantalum, titanium, zirconium, molybdenum, ruthenium, rhodium, palladium, hafnium, tungsten, rhenium, osmium, and iridium. The offset structure is configured to enable a medium to contact the first conductor and the second conductor along a length of the cable while providing physical separation of the first and second conductors. As described herein, the term "medium" refers to a fluid (e.g., water) or a high-particulate ambient environment that nominally provides for electrical arcing between electrical conductors of different voltage potential across a physical separation through the medium. However, because both the first conductor and the second conductor are formed of self-passivating metals and due to the spacing provided by the offset structure, submerged or "wet" ambient environments (e.g., high humidity) do not cause any signal loss and/or cross-talk issues between the first conductor and the second conductor.

Therefore, the cable is not required to be sealed and is ready for use in submerged or "wet" environments. Because the cable is not required to be sealed (i.e., is designed to operate without requirement for waterproofing or being a watertight enclosure), engineering requirements and cost can be greatly reduced. In other words, foregoing a waterproof construction means that the cable can utilize a simple, less complicated design which welcomes water or fluid into the cable and provides the benefit or advantage of a large reduction of engineering requirements and maintenance costs, for example. Therefore, no special actions or seals are required to preclude entry of fluids into the cable. It will be appreciated that although water is used as an example of a fluid herein, any fluid can be considered for introduction into the cable. Conversely, a cable which is designed to be sealed or moisture proof is often associated with additional costs, such as maintenance of the seal, repair, or field failures when the seal is penetrated by moisture, especially when the cables are located in remote locations or not easily accessible.

Additionally, the above-described concept can be applied to a twisted pair. For example, a cable can include a first conductor formed of a first self-passivating metal, such as niobium, a second conductor formed of a second self-passivating metal, a first portion of an offset structure surrounding at least a portion of the first conductor, and a second portion of an offset structure surrounding at least a portion of the second conductor. The first conductor and the second conductor can be helically intertwined to form the twisted pair. Again, the offset structure is configured to enable a medium, such as water, to contact the first conductor and the second conductor along a length of the twisted pair.

Finally, a cable connection system (e.g., RF coaxial connector system including a jack and a plug) can include signal conducting contacts and/or surfaces formed of self-passivating metals. For example, a first connector can include a first housing, a first contact formed from a self-passivating metal (e.g., niobium) and have a first portion configured to be in contact with a medium (e.g., a fluid, such as water), and a first contact insulator at least partially surrounding a second portion of the first contact. A second connector can include a second housing, a second contact formed from a self-passivating metal (e.g., niobium) and have a first portion configured to be in contact with the medium, and a second contact insulator at least partially surrounding a second portion of the second contact. The use of the self-passivating metal for the first contact and the second contact enables the cable connection system to operate with a low loss across a variety of RF power levels in the submerged or "wet" environments.

However, it will be appreciated that water or fluid is not necessary for operation or signal conduction during use of the cable. The cable and cable connection system of the present disclosure can thus be used in submerged and/or dry environments and be unaffected by insertion loss and impedance issues when moisture is present within the cable, while providing shielded signal transmission and a known, controlled intrinsic impedance over the length of the cable which is lower than an impedance for a typical "dry" or "sealed" cable of the same physical parameters and separating dielectric material type. For example, the "dry" or watertight cable dielectric can incorporate a combination of air (dielectric constant, $\varepsilon_r$=1) and polyethylene ($\varepsilon_r$=2.2), while the cables described herein can include the presence of water ($\varepsilon_r$=78), which is allowed to freely flow inside the cable and remain inside the cable throughout the lifetime of the cable. Again, although water is discussed as an example of a fluid, any fluid can be utilized.

Figure 1B:
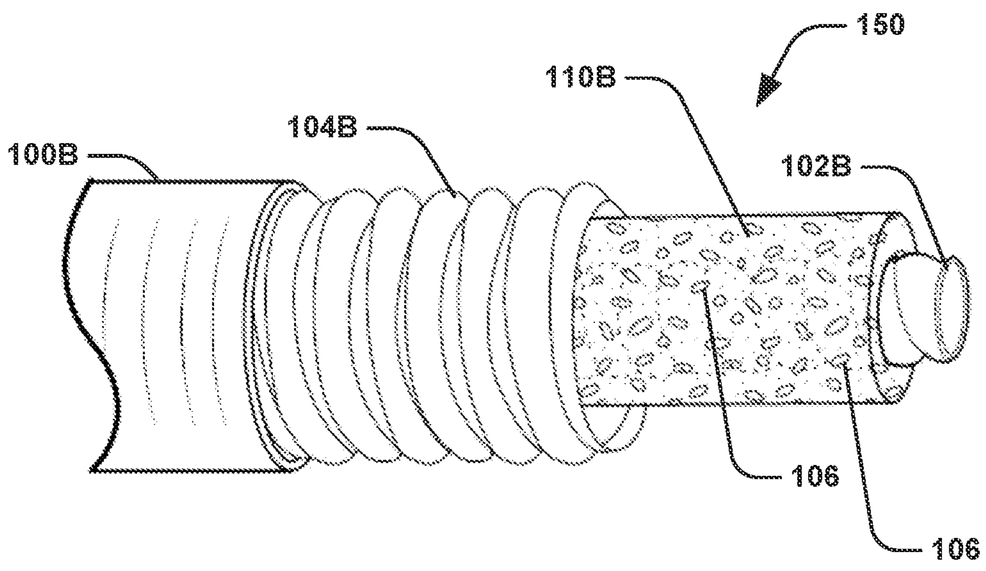

FIGS. 1A-1B illustrate an example diagram of a cable 100A, 100B with an offset structure 110A, 110B. In a described example, a cable 100A, 100B can include a first conductor 102A, 102B, a second conductor 104A, 104B, and an offset structure 110A, 110B. The first conductor 102A, 102B can be formed to include a first self-passivating metal. The second conductor 104A, 104B can be formed to include a second self-passivating metal. As used herein, self-passivating metals can also be self-insulating conductors or noble metals. Further, according to one example, the self-passivating metals can have a hydrophobic coating applied to an outer surface of the self-passivating metal. One example of a self-passivating metal that can be utilized is niobium. Self-passivating metals form a corrosion-resistant, insulating oxide layer when in a submerged environment, such as underwater, for example. The offset structure 110A, 110B can be disposed between the first conductor 102A, 102B and the second conductor 104A, 104B and formed of a dielectric material, such as plastic, for example. The offset structure 110A, 110B can be configured to enable a medium to contact the first conductor 102A, 102B and the second conductor 104A, 104B along a length of the cable 100A, 100B.

As seen in FIGS. 1A-1B, the first conductor 102A, 102B can be at least partially surrounded by the offset structure 110A, 110B, and thus, act as a coaxial cable center conductor. The offset structure 110A, 110B can be at least partially surrounded by the second conductor 104A, 104B, which can act as a coaxial shield. The offset structure 110A, 110B can be configured to maintain a constant distance between the first conductor 102A, 102B and the second conductor 104A, 104B.

As seen in FIG. 1A, the offset structure 110A can have a helical shape to enable the medium to contact the first conductor 102A and the second conductor 104A along the length of the cable 100A.

As seen in FIG. 1B, the offset structure 110B can include one or more openings 106 configured to enable the medium to contact the first conductor 102B and the second conductor 104B. For example, the offset structure 110B can have an open cell structure including a plurality of cells. Each cell can include two or more openings 106 which can be configured to interface with two or more of another cell, the first conductor 102B, or the second conductor 104B. According to one example, the offset structure 110B can be formed of a material configured to retain fluids or otherwise provide fluid retention features (e.g., layered dielectrics, capillary functions, etc.) to retain fluid 150 within the cable 100B even after the cable 100B is removed from a fluid immersed environment. In this way, the offset structure 110B can facilitate impedance control for the cable 100B. As another example, the offset structure 110B can be formed of a mesh material.

According to one example, the cable 100A, 100B of FIG. 1A or FIG. 1B can be a coaxial cable that yields around 50 ohms impedance with low relative permittivity ($\varepsilon_r$) values (e.g., 2.2-2.5) and have a characteristic impedance drop by a factor of around 5 to approximately 9.2 ohms. Cutoff frequency and velocity of propagation can also decrease correspondingly. These parameter value decreases are suitable for use in submerged or "wet" (e.g., water-soaked) environments for a variety of applications. Assuming the 9-ohm impedance and 120 volts, an RF power handling capacity estimate for such a cable can be determined by:

$$P = \frac{V^2}{R} = \frac{120*120}{9} = 1600 \text{ watts};$$

and $$I = \frac{P}{V} = \frac{1600}{120} = 13.33 \text{ amps}$$

Such an RF power level of 1.6 kW is usable for a variety of applications.

Figure 2A:
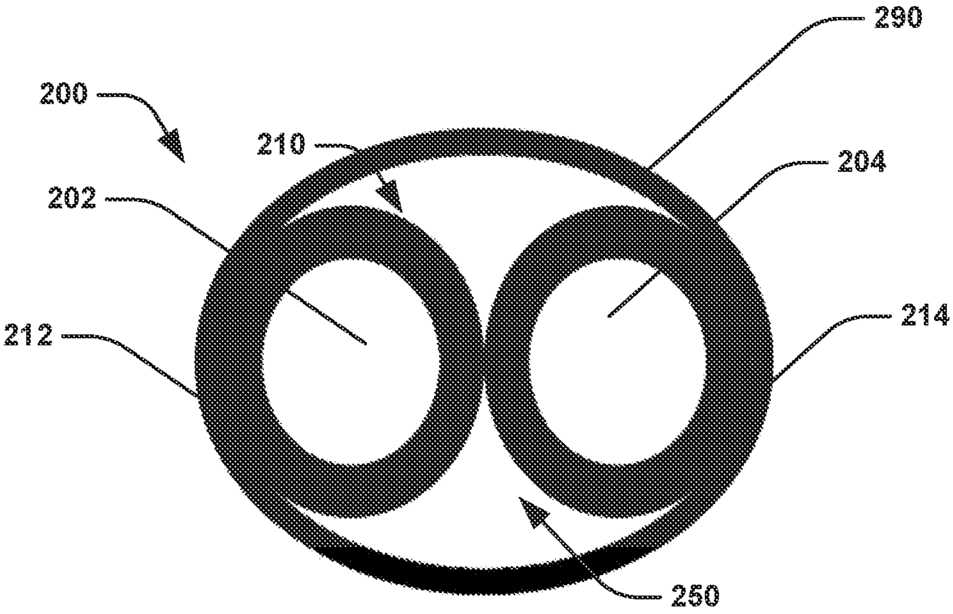
FIGS. 2A-2B illustrate an example diagram of a cable with an offset structure.
Figure 2B:
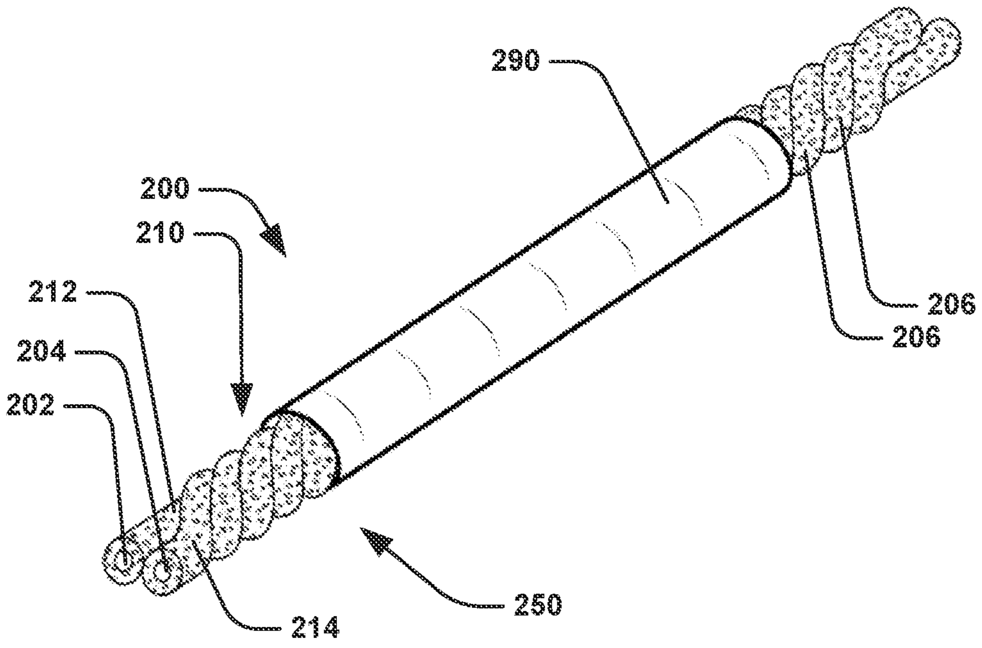

FIGS. 2A-2B illustrate an example diagram of a cable 200 with an offset structure 210. In a described example, a cable 200 can include a first conductor 202, a second conductor 204, and an offset structure 210 having a first portion 212 and a second portion 214. The first conductor 202 can be formed to include a first self-passivating metal. The second conductor 204 can be formed to include a second self-passivating metal. The first conductor 202 and the second conductor 204 can be helically intertwined to form a 'twisted pair', for example. The first portion 212 of the offset structure 210 can be configured to at least partially surround the first conductor 202 and the second portion 214 of the offset structure 210 can be configured to at least partially surround the second conductor 204. In the example of FIG. 2B, the offset structure 210 is shown as the open cell example. The offset structure 210 provides insulation for the first conductor 202 and the second conductor 204 and a consistent impedance between the pair of conductors 202, 204. Thus, the first portion 212 and the second portion 214 of the offset structure 210 can be configured to enable the medium 250 to contact the first conductor 202 and the second conductor 204 along the length of the cable 200 in this way. Additionally, the cable 200 can include a cable insulator 290 at least partially surrounding the first portion 212 and the second portion 214.

According to one example, the first portion 212 or the second portion 214 can have a helical shape (e.g., similar to FIG. 1A) to enable the medium 250 to contact the first conductor 202 and the second conductor 204 along the length of the cable 200. According to another example, at least one of the first portion 212 or the second portion 214 can include one or more openings 206 configured to enable the medium 250 to contact the first conductor 202 and the second conductor 204 or has an open cell structure including a plurality of cells. Each cell can include two or more openings 206 which can be configured to interface with two or more of another cell, the first conductor 202, or the second conductor 204. The cable insulator 290 can surround the first and second conductors 202, 204 and the corresponding portions 212, 214 of the offset structure 210.

According to one example, the cable 200 of FIG. 2A or FIG. 2B can be a twisted pair cable that yields around ~112 ohms impedance with low E, values (e.g., 2.2-2.5) and have a characteristic impedance drop by a factor of around 5 to approximately 19 ohms.

Figure 3:
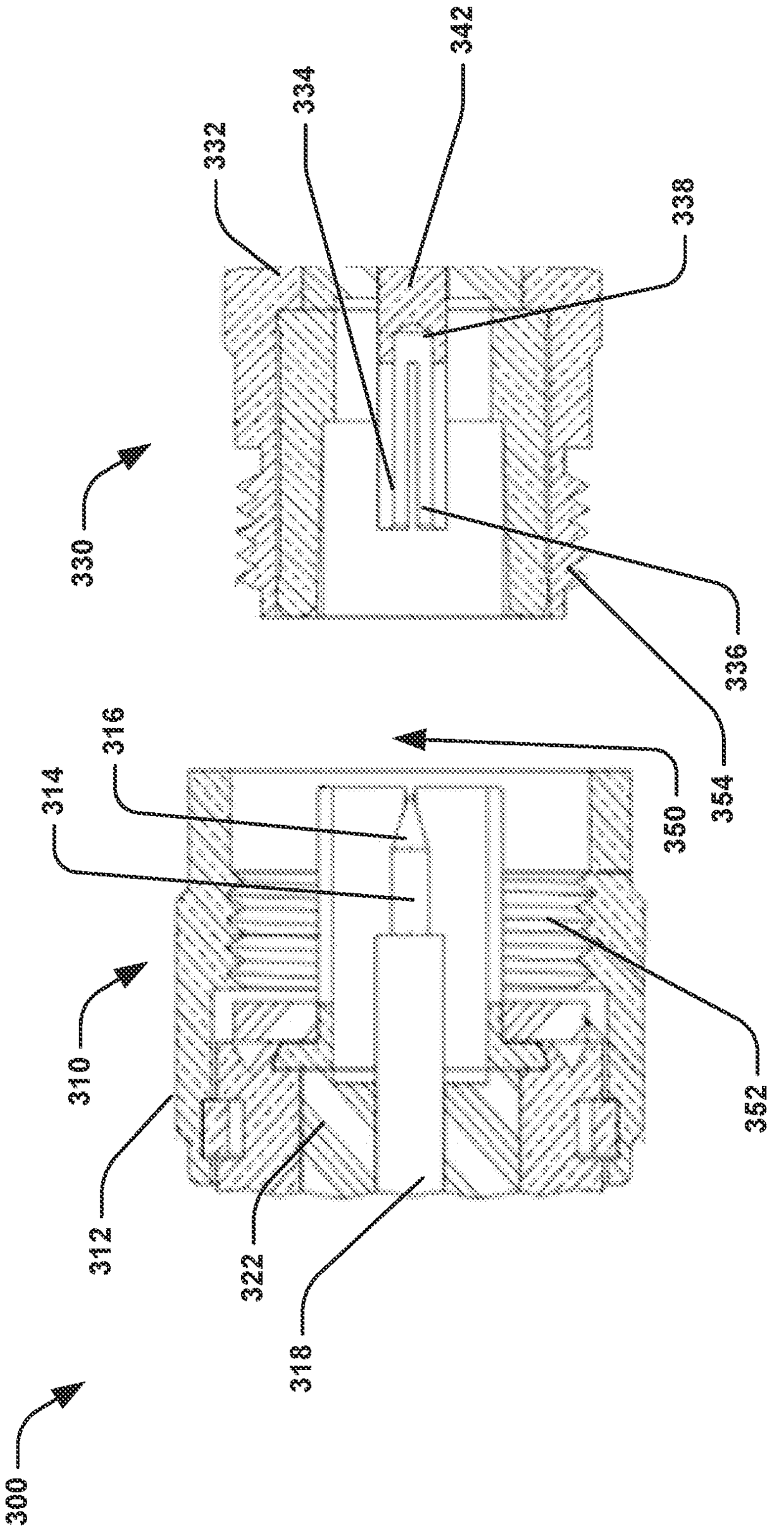
FIG. 3 illustrates an example diagram of a cable connection system.

FIG. 3 illustrates an example diagram of a cable connection system 300. The cable connection system 300 of FIG. 3 can include any of the cables (e.g., 100A, 100B, 200) of FIGS. 1-2 discussed herein. The cable connection system 300 can further include a first connector 310 and a second connector 330.

The first connector 310 can include a first housing 312, a first contact 314 formed from a third self-passivating metal and having a first portion 316 configured to be in contact with a medium 350, and a first contact insulator 322 at least partially surrounding a second portion 318 of the first contact 314. The first contact 314 of the first connector 310 can be electrically connected to the first conductor of the corresponding cable (e.g., at the second portion 318). The second connector 330 can include a second housing 332, a second contact 334 formed from a fourth self-passivating metal and having a first portion 336 configured to be in contact with the medium 350, and a second contact insulator 342 at least partially surrounding a second portion 338 of the second contact 334. According to one example, two or more of the first self-passivating metal, the second self-passivating metal, the third self-passivating metal, and the fourth self-passivating metal can be the same self-passivating metal (e.g., niobium). It will be appreciated that in some examples, merely one of the first contact 314 or the second contact 334 is formed of the self-passivating metal while the other can be formed of a non-self-passivating metal. Certain self-passivating metals provide a benefit of being connectable to non-self-passivating metals without generating inherent voltages (which may not be desirable). Therefore, forming one or both of the first contact 314 or the second contact 334 of self-passivating metal, such as niobium, is advantageous.

The first housing 312 and the second housing 332 can be configured to be coupled to provide an electrical connection between the first contact 314 of the first connector 310 and the second contact 334 of the second connector 330 (e.g., by mating portion 316 of the first contact 314 with the first portion 336 of the second contact 334). Additionally, the first housing 312 and the second housing 332 can be formed of corrosion-resistant non-conducting materials, thereby enabling the cable connection system 300 to be utilized underwater without outer shell conducting materials. Contact retention features can be implemented using mechanical coupling techniques, such as by using a mated-pair retention system (e.g., ring nut with threads 352 and threaded sleeve 354) to ensure the connector set stays mated across multiple environments, for example. According to another example, the cable connection system 300 can include a multi-contact connector with multiple first connectors and multiple second connectors.

Each of the first contact insulator 322 and the second contact insulator 342 can be formed to include a dielectric material having a dielectric constant which can be approximately equal to a dielectric constant of the medium 350. For example, $TiO_2$ can be utilized for the material for either contact insulator 322, 342 because $TiO_2$ generally has good retention characteristics for the corresponding contact while also providing the benefit of not adding a large impedance.

In any event, this similar dielectric constant is utilized to enable impedance matching to connect a source to the cable, the cable to a load, such as an electronic assembly (e.g., which can be 50-ohm, 90-ohm, 120-ohm, etc.) and from the load to an antenna, for example. This changes a resultant overall cable impedance which was previously designed for ~50 ohms for the "dry" cable to less than 10 ohms for the cable described herein, assuming the cable dimensions remain the same. However, the impedance shift to 10 ohms does not preclude use of the cable when considerations for input and/or output matching to source and load functions are matched to the cable impedance value. Thus, the impedance of the cable connection system 300 can be designed according to a system operating impedance. For example, components or portions of the cable connection system 300 impedance can be set based on factors including transmission source impedance, submerged or wet RF connector impedance, submerged or wet transmission line impedance, and load (e.g., antenna) impedance, etc.

Figure 4:
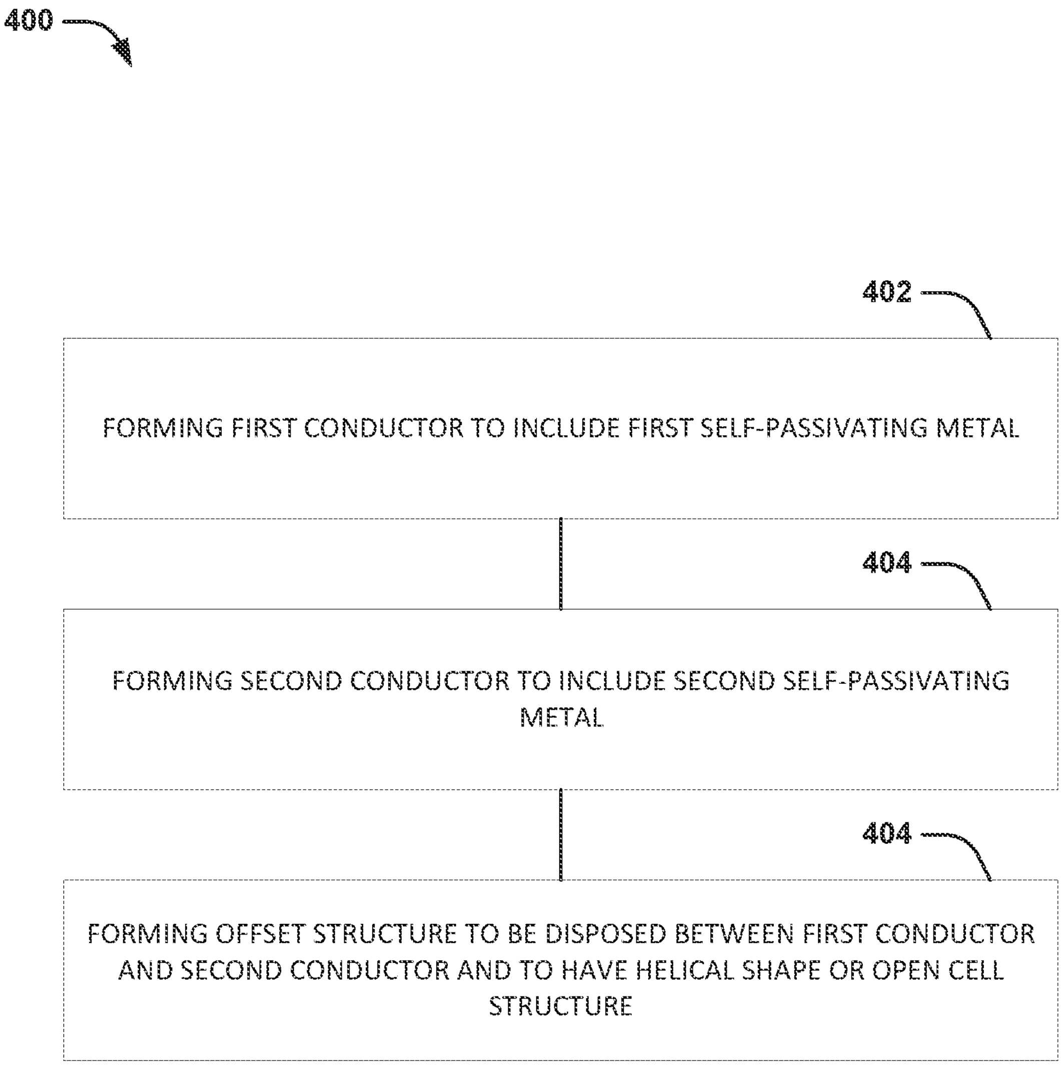
FIG. 4 illustrates an example method of forming a cable with an offset structure.

FIG. 4 illustrates an example method of forming a cable with an offset structure. In a described example, a method 400 of forming a cable (e.g., 100A, 100B, 200) can include forming 402 a first conductor (e.g., 102A, 102B, 202) to include a first self-passivating metal, forming 404 a second conductor (e.g., 104A, 104B, 204) to include a second self-passivating metal, and forming 406 an offset structure (e.g., 110A, 110B, 210) to be disposed between the first conductor and the second conductor and formed to maintain a constant distance between the first conductor and the second conductor.

The offset structure can be formed to include one or more openings (e.g., 106, 206) configured to enable the medium to contact the first conductor and the second conductor. For example, the offset structure can be formed to have an open cell structure including a plurality of cells. Each cell can include two or more openings which can be configured to interface with two or more of another cell, the first conductor, or the second conductor.

According to the example of FIGS. 1A-1B, the first conductor can be at least partially surrounded by the offset structure and the offset structure can be at least partially surrounded by the second conductor.

According to the example of FIGS. 2A-2B, the first conductor, the second conductor, and the offset structure can be formed to have a helical shape. For example, the first portion of the offset structure can be formed to at least partially surround the first conductor, the second portion of the offset structure can be formed to at least partially surround the second conductor, and the first conductor and the second conductor can be formed to be helically intertwined.

In this description, the term "couple" can cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A cable, comprising:

a first conductor formed to include a first self-passivating metal;

a second conductor formed to include a second self-passivating metal; and an offset structure disposed between the first conductor and the second conductor, the offset structure is configured to enable a medium to contact the first conductor and the second conductor along a length of the cable.

2. The cable of claim 1, wherein the offset structure has a helical shape.

3. The cable of claim 1, wherein the first conductor is at least partially surrounded by the offset structure, wherein the offset structure is at least partially surrounded by the second conductor, and wherein the offset structure includes one or more openings configured to enable the medium to contact the first conductor and the second conductor.

4. The cable of claim 1, wherein the offset structure has an open cell structure including a plurality of cells, wherein each cell includes two or more openings which are configured to interface with two or more of another cell, the first conductor, or the second conductor.

5. The cable of claim 1, wherein the offset structure is configured to maintain a constant distance between the first conductor and the second conductor.

6. The cable of claim 1, wherein the offset structure comprises:

a first portion configured to at least partially surround the first conductor; and a second portion configured to at least partially surround the second conductor, wherein the first portion and the second portion are configured to enable the medium to contact the first conductor and the second conductor along the length of the cable.

7. The cable of claim 6, wherein at least one of the first portion or the second portion includes one or more openings configured to enable the medium to contact the first conductor and the second conductor or has an open cell structure including a plurality of cells, wherein each cell includes two or more openings which are configured to interface with two or more of another cell, the first conductor, or the second conductor.

8. The cable of claim 6, wherein the first conductor and the second conductor are helically intertwined.

9. The cable of claim 6, further comprising a cable insulator at least partially surrounding the first portion and the second portion.

10. A cable connection system, comprising the cable of claim 1, further comprising:

a first connector comprising a first housing, a first contact formed from a third self-passivating metal and having a first portion configured to be in contact with the medium, and a first contact insulator at least partially surrounding a second portion of the first contact, wherein the first contact of the first connector is electrically connected to the first conductor of the cable; and a second connector comprising a second housing, a second contact formed from a fourth self-passivating metal and having a first portion configured to be in contact with the medium, and a second contact insulator at least partially surrounding a second portion of the second contact, the first housing and the second housing are configured to be coupled to provide an electrical connection between the first contact of the first connector and the second contact of the second connector.

11. A method of forming a cable, comprising:

forming a first conductor to include a first self-passivating metal;

forming a second conductor to include a second self-passivating metal; and forming an offset structure to be disposed between the first conductor and the second conductor and formed to maintain a constant distance between the first conductor and the second conductor, wherein the offset structure is configured to enable a medium to contact the first conductor and the second conductor along a length of the cable.

12. The method of claim 11, wherein the offset structure is formed to have a helical shape.

13. The method of claim 11, wherein the first conductor is at least partially surrounded by the offset structure, wherein the offset structure is at least partially surrounded by the second conductor, and wherein the offset structure is formed to include one or more openings configured to enable the medium to contact the first conductor and the second conductor.

14. The method of claim 11, wherein the offset structure is formed to have an open cell structure including a plurality of cells, wherein each cell includes two or more openings which are configured to interface with two or more of another cell, the first conductor, or the second conductor.

15. The method of claim 11, further comprising:

forming a first portion of the offset structure to at least partially surround the first conductor;

forming a second portion of the offset structure to at least partially surround the second conductor; and forming the first conductor and the second conductor to be helically intertwined.

16. A cable connection system, comprising:

a cable, comprising:

a first conductor formed to include a first self-passivating metal;

a second conductor formed to include a second self-passivating metal; and an offset structure disposed between the first conductor and the second conductor, the offset structure is configured to enable a medium to contact the first conductor and the second conductor along a length of the cable;

a first connector comprising a first housing, a first contact formed from a third self-passivating metal and having a first portion configured to be in contact with the medium, and a first contact insulator at least partially surrounding a second portion of the first contact, wherein the first contact of the first connector is electrically connected to the first conductor of the cable; and a second connector comprising a second housing, a second contact formed from a fourth self-passivating metal and having a first portion configured to be in contact with the medium, and a second contact insulator at least partially surrounding a second portion of the second contact, the first housing and the second housing are configured to be coupled to provide an electrical connection between the first contact of the first connector and the second contact of the second connector.

17. The cable connection system of claim 16, wherein each of the first contact insulator and the second contact insulator is formed to include a dielectric material having a dielectric constant which is approximately equal to a dielectric constant of the medium.

18. The cable connection system of claim 16, wherein two or more of the first self-passivating metal, the second self-passivating metal, the third self-passivating metal, and the fourth self-passivating metal are the same self-passivating metal.

19. The cable connection system of claim 16, wherein the first conductor is at least partially surrounded by the offset structure, wherein the offset structure is at least partially surrounded by the second conductor, and wherein the offset structure includes one or more openings configured to enable the medium to contact the first conductor and the second conductor.

20. The cable connection system of claim 16, wherein the offset structure has an open cell structure including a plurality of cells, wherein each cell includes two or more openings which are configured to interface with two or more of another cell, the first conductor, or the second conductor.

* * * * *